US006851538B2

(12) United States Patent
Meyer et al.

(10) Patent No.: US 6,851,538 B2
(45) Date of Patent: Feb. 8, 2005

(54) CONTROL UNIT GEAR OR SHIFT PROGRAM SELECTION OF AN AUTOMATIC VEHICLE GEARBOX

(75) Inventors: Jörg Meyer, Wagenfeld (DE); Ludger Rake, Diepholz (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/381,616

(22) PCT Filed: Aug. 20, 2002

(86) PCT No.: PCT/DE02/03100

§ 371 (c)(1),
(2), (4) Date: Mar. 26, 2003

(87) PCT Pub. No.: WO03/019048

PCT Pub. Date: Mar. 6, 2003

(65) Prior Publication Data

US 2003/0173181 A1 Sep. 18, 2003

(30) Foreign Application Priority Data

Aug. 22, 2001 (DE) .......................... 101 40 164

(51) Int. Cl.⁷ .......................... F16H 61/22; F16H 59/10
(52) U.S. Cl. .............................. 192/219.4; 74/473.19; 74/473.3; 70/245
(58) Field of Search ................ 74/473.21, 473.23, 74/473.3, 473.12, 473.19; 192/219.4, 219.6; 70/245, 246, 247, 248, 202

(56) References Cited

U.S. PATENT DOCUMENTS

| | | | | |
|---|---|---|---|---|
| RE26,884 E | * | 5/1970 | Hurst et al. ................ 74/473 |
| 5,027,929 A | * | 7/1991 | Ratke et al. ................ 70/248 |
| 5,150,593 A | | 9/1992 | Kobayashi et al. |
| 5,187,999 A | * | 2/1993 | Kobayashi et al. ............ 74/528 |
| 5,309,744 A | * | 5/1994 | Kito et al. ................ 70/248 |
| 5,311,756 A | * | 5/1994 | Villani .................... 70/247 |
| 5,431,266 A | | 7/1995 | Ito et al. |
| 5,555,755 A | * | 9/1996 | Padrin .................... 70/247 |
| 5,588,330 A | | 12/1996 | Kataumi et al. |
| 5,682,777 A | * | 11/1997 | Specht .................... 70/247 |
| 5,778,710 A | * | 7/1998 | Hu et al. ................ 70/247 |
| 6,295,887 B1 | * | 10/2001 | DeJonge et al. ............ 74/473.3 |
| 2002/0170376 A1 | | 11/2002 | Giefer et al. |

FOREIGN PATENT DOCUMENTS

| | | |
|---|---|---|
| DE | 90 05 481 | 10/1990 |
| DE | 42 06 251 A1 | 9/1992 |
| DE | 44 42 789 A1 | 6/1996 |
| DE | 199 20 095 C1 | 8/2000 |
| DE | 100 05 167 A1 | 8/2001 |

\* cited by examiner

*Primary Examiner*—Richard M. Lorence
(74) *Attorney, Agent, or Firm*—McGlew and Tuttle, P.C.

(57) ABSTRACT

A control unit for the gear or shift program selection of an automatic transmission of a motor vehicle is presented, which has a emergency release mechanism. With this a parking brake of the motor vehicle transmission can be released by an operating device that can be actuated by the driver. A housing (3) is provided and a selector lever (1), which can be brought into at least two end positions, in which control unit the operating device of the emergency release mechanism is an integral part of the control unit, and in which the operating device has a detachable stop element (7). The stop element (7) is secured in a mount (9) of the control unit by means of a coded release mechanism (15) and acts as a movement limitation for the release movement of the parking brake by the operating device of the emergency release mechanism in the non-actuated state. The emergency release mechanism can also be actuated due to this novel design even with the control unit only, and, moreover, increased requirements on theft protection can be met.

20 Claims, 5 Drawing Sheets

CONTROL UNIT GEAR OR SHIFT PROGRAM SELECTION OF AN AUTOMATIC VEHICLE GEARBOX

FIELD OF THE INVENTION

The present invention pertains to a control unit for the gear or shift program selection of a motor vehicle automatic transmission, which has an emergency release mechanism, by which a parking brake of the motor vehicle transmission can be released by means of an operating device that can be operated by the driver, with a housing and with a selector lever that can be brought into at least two end positions.

BACKGROUND OF THE INVENTION

Automatic transmissions, for which the operating unit of this type can be used, usually have a plurality of operating steps, which can be manually preselected by the driver and are called gears. One of the operating steps of an automatic transmission is a so-called park position. If the park position is selected on the automatic transmission by means of the control unit, blocking is brought about in the transmission by suitable measures, so that movement of the vehicle is no longer possible when the park position is engaged.

However, situations are conceivable in which the vehicle shall nevertheless be moved despite the parking brake being engaged, e.g., for towing a vehicle that broke down. To remedy this situation, it is known from the state of the art that emergency release mechanisms may be provided, which make possible the mechanical release of the engaged parking brake. The emergency release mechanisms in question usually comprise an operating device, e.g., in the form of a draw lever, by means of which the driver can release the parking brake engaged in the motor vehicle transmission by a pulling movement on the operating device via a cable. Such an emergency release can thus, of course, additionally also release the engagement of the parking brake. Since a vehicle cannot be stolen by rolling or towing away any longer with the parking brake engaged, which can be considered to be an effective theft protection measure, an emergency release of the parking brake should be able to be performed by authorized persons only.

SUMMARY OF THE INVENTION

The object of the present invention is therefore to improve a control unit of this type such that release of the parking brake is provided, which supports the theft protection measures currently used in motor vehicles, and is also designed in terms of its operation such that the operating devices that are present individually and are commonly used in the state of the art for the emergency release mechanism of the parking brakes of motor vehicle automatic transmissions can be eliminated.

According to the present invention, the operating device of the emergency release mechanism is an integral part of the control unit and has a detachable stop element, which is secured in the mount of the control unit by means of a coded release mechanism and is used as a movement limitation for the releasing movement of the parking brake by the operating device of the emergency release mechanism in the non-actuated state.

Due to the operating device of the emergency release mechanism being fully integrated, manufacturing and assembly costs for the separate arrangement of the elements of the emergency release mechanism are saved, on the one hand, and, moreover, the integration leads to a reduction of necessary operating elements for the driver and thus to an ergonomically more favorable, clearer handling of the motor vehicle transmission. Moreover, the usual requirements currently imposed in terms of theft protection are taken into account to the fill extent due to the coded release mechanism of the stop element.

It proved to be particularly advantageous that the releasing movement of the parking brake takes place by displacing the selector lever for the gear or shift program selection such that the emergency release position is reached by displacing the selector lever beyond its end positions. Thus, the same operating element in the form of the selector lever is available to the driver for both the nominal control of the motor vehicle transmission and the actuation of the emergency release. The operating device for the emergency release mechanism is embodied by a control element, which is arranged at the selector lever, and the control element is coupled with the parking brake arranged at the motor vehicle transmission by means of a connection member.

Corresponding to an advantageous variant of the subject of the present invention, the control element may be designed as a carrier, which engages a hook-shaped recess on the selector lever as soon as the latter has been brought into the release position for the parking brake, i.e., into the emergency release position. The carrier may be coupled with the parking brake by means of, e.g., a cable acting as a connection member, but the present invention is, of course, not limited to this, because any mechanical connection is possible. The mechanical embodiment offers an inexpensive possibility of variation according to the present invention.

It proved to be advantageous for other fields of application for the control element to be provided with a Hall sensor system at the selector lever, where the control signal generated by the Hall sensor system comprising a Hall sensor and the corresponding permanent magnet is to be considered to be an information and monitoring signal for the position of the parking brake.

The latter embodiment variant offers especially the advantage that the emergency release position of the gearshift lever can be additionally transmitted to the motor vehicle transmission via the control lines already present in shift-by-wire shifting mechanisms.

Furthermore, a variant of the present invention, in which a locking device is arranged in the housing of the control unit for fixing the operating device in the release position for the parking brake is arranged, proved to be advantageous. The locking device ensures that during the towing of the vehicle, during which the operating device, preferably the selector lever, is brought into the emergency release position, the selector lever remains in the selected position, and relocking of the parking brake during towing is thus ruled out. The locking device may advantageously comprise here a ratchet lever mounted rotatably in the housing with a recess and a detent arranged in a fixed position at the selector lever, where the recess and the detent are engaged in the parking brake release position of the selector lever.

The stop element, which must be removed from its mount within the control unit to actuate the release position of the selector lever, can be secured against unauthorized removal by a release mechanism, which can be actuated by a key code. This means, e.g., that the ignition key necessary for the use of the vehicle must be introduced into the release mechanism present at the stop element to be able to remove the stop element and subsequently to actuate the emergency release. Thus, the emergency release can be actuated only by a person who also has the ignition key for operating the vehicle. Corresponding to another advantageous embodiment, the release mechanism may be provided with an electronic coding device. This may comprise, e.g., an alphanumeric keypad, in which a multiple-digit code term is to be entered in order to clear the release mechanism and to make it possible to remove the stop element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
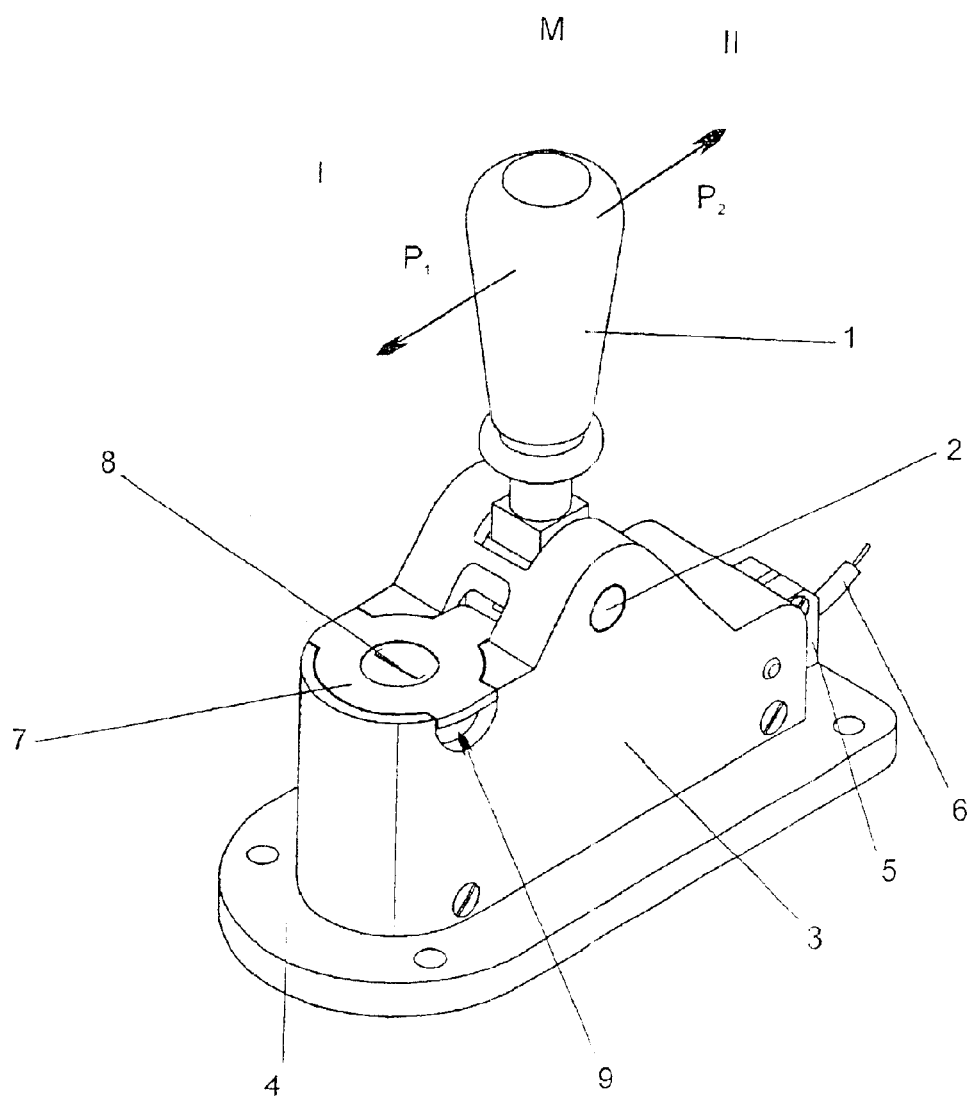
FIG. 1 is a perspective external view of the control unit according to the present invention.

Referring to the drawings in particular, the control unit for the gear or shift program selection of a motor vehicle automatic transmission, which is shown in a perspective view in FIG. 1 has a selector lever 1, which is arranged pivotably around an axis of rotation 2 in a housing 3 of the control unit. On the lower side of the housing 3 facing away from the selector lever, the housing is provided with a base 4, which is used to fasten the control unit on a body-side mount of a motor vehicle, which said mount is not shown in detail. The selector lever 1 can be moved in the longitudinal direction of the housing 3 corresponding to the arrows $P_1$ and $P_2$ because of it being mounted by means of the axis of rotation 2, so that there are two lateral end positions I and II besides the middle position of the selector lever 1 shown in FIG. 1.

FIG. 1 also shows that a holding element 5 for a cable 6 is arranged at the longitudinal end of the control unit. The holding element 5 is used to fix and guide one free end of the cable 6 at the housing 3. The other end of the cable 6, which is not shown, is coupled with a parking brake on the motor vehicle transmission of the corresponding motor vehicle, which parking brake is not designated specifically because it is known from the state of the art. A stop element 7, which is used in the built-in state shown in FIG. 1 as a movement limitation for the release movement of the parking brake by the selector lever 1, can be recognized at the other end of the control unit facing away from the holding element 5. The functions of the stop element 7 in conjunction with an operating device for actuating the emergency release mechanism for the parking brake will be explained in greater detail in the following figures.

FIG. 1 additionally shows that the stop element 7 has a slot-like recess 8 for introducing a key on its lop side. By introducing a correspondingly correctly coded key, a coded release mechanism can be actuated within the stop element by turning the key, so that the stop element 7 can be removed from its mount 9 within the housing 3 of the control unit.

Figure 2:
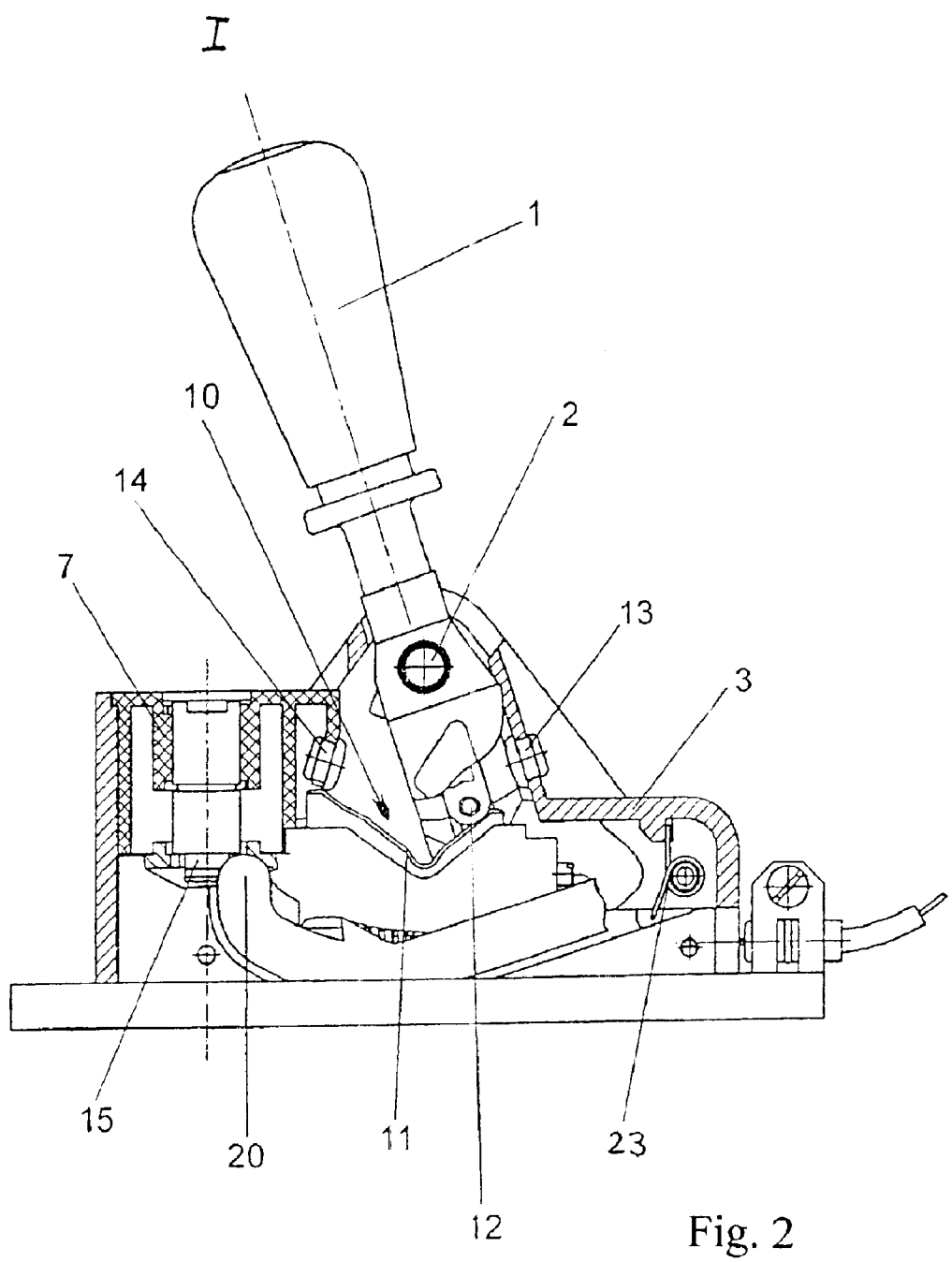
FIG. 2 is a sectional view through the control unit according to the present invention in a first shifting end position of the selector lever.

The sectional view through the housing 3 of the control unit, which is shown in FIG. 2, shows that the selector lever 1 has a gate guide 10 at its free end mounted in the housing 3. The gate guide 10 comprises a gate path 11 and a spring-loaded wheel 12 rolling thereon. The cooperation of the gate path 11 and the wheel 12 causes the selector lever 1 to have a stable middle position M, whereas the additionally present end positions I and II of the selector lever 1 are "unstable" positions, from which the selector lever 1 is automatically returned by the operator into the stable middle position M. The movement limitation for the end position I is defined by an elastic rubber buffer 13, which is accommodated in an associated opening of the housing 3. A rubber buffer 14, which is fastened at the stop element 7 which can be removed from the housing 3, is likewise present for the defined end position II of the selector lever 1. The release mechanism 15, by which the stop element 7 is secured within the housing 3 as long as no correctly coded key has been introduced into the recess 8 of the stop element 7, is located on the underside of the stop element 7.

Figure 3:
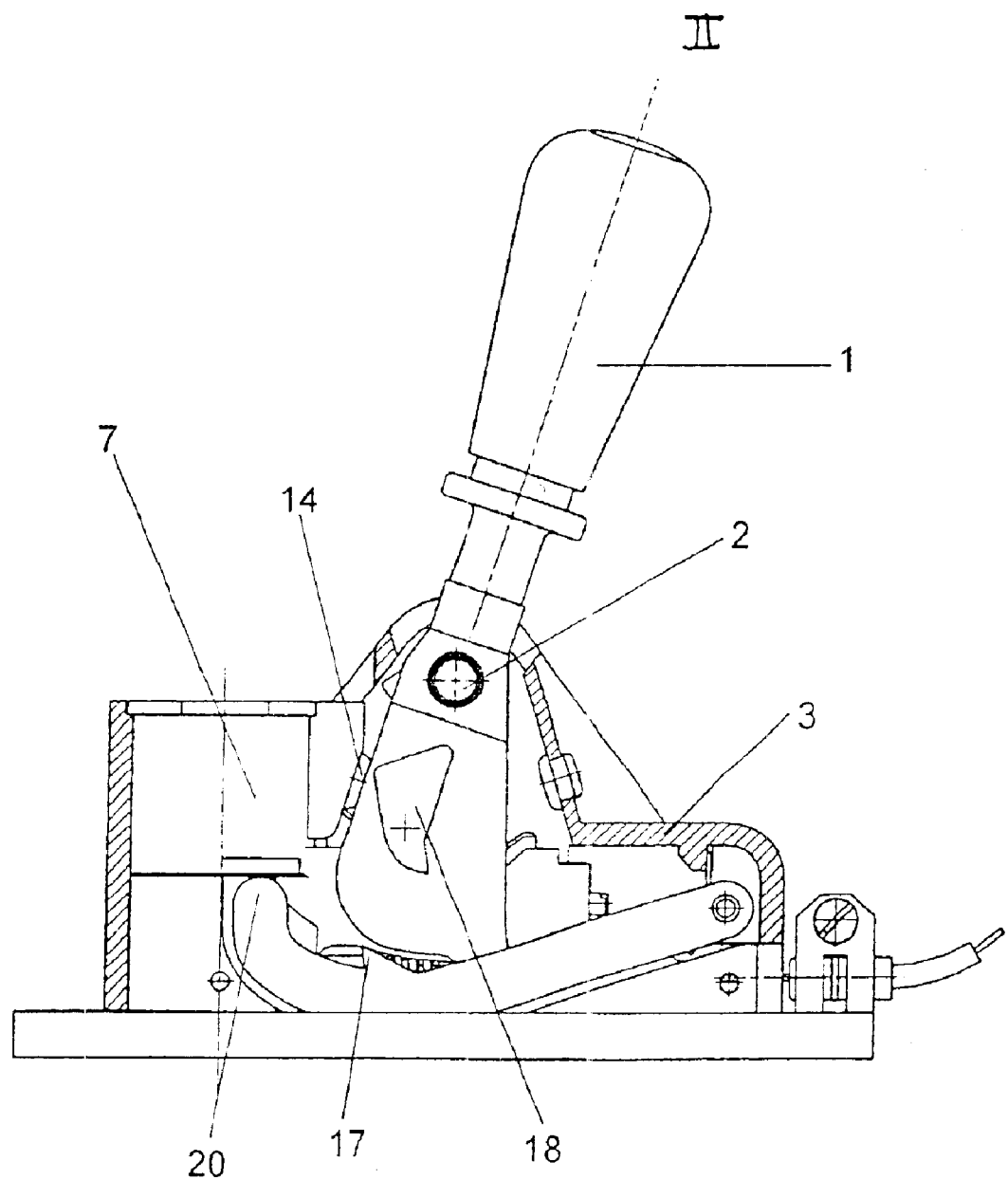
FIG. 3 is a sectional view of the control unit with the selector lever in the opposite second end positing.

FIG. 3 shows the selector lever 1 in its end position II located opposite the position 1, with the selector lever 1 being in contact by a contact surface with the rubber buffer 14 of the stop element 7. FIG. 3 also shows that a locking device 16 comprising a ratchet lever 17 and a detent 18 arranged at the side wall of the selector lever 1 (see FIG. 4) is accommodated in the housing 3, the ratchet lever 17 being pressed by a spring 23 visible in FIG. 2 with its front free end 20 against the stop element 7.

Figure 4:
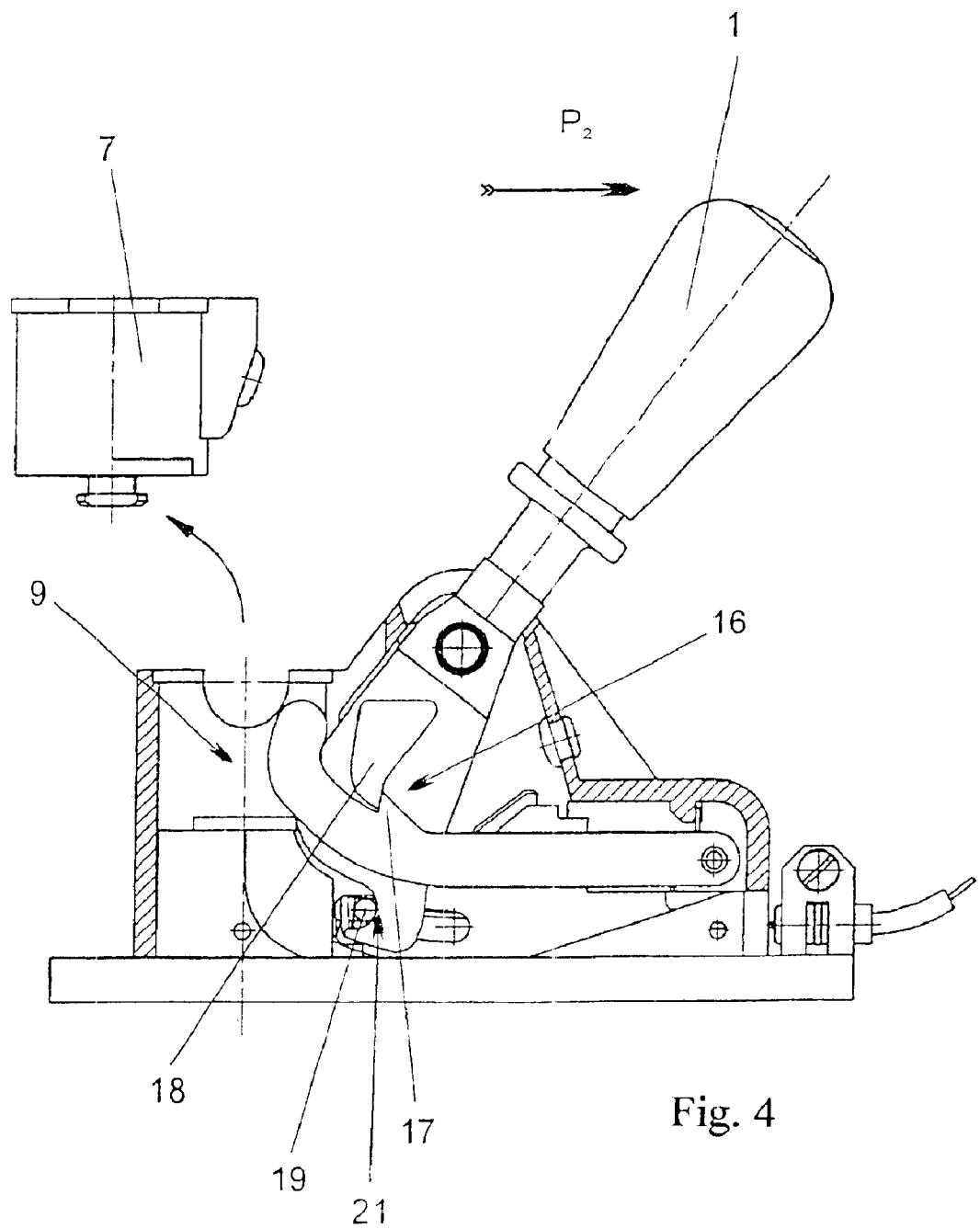
FIG. 4 is a sectional view through the control unit with the selector lever in the cleared position for the parking brake.

FIG. 4 shows the control unit in the emergency release position, in which the selector lever 1 assumes a farther pivoted position compared with position II. The requirement for the possibility of pivoting the selector lever 1 beyond the end position II is the fact that the stop element 7 was removed from its mount 9 in the housing 3, as is shown in FIG. 4. The removal of the stop element 7 causes, on the one hand, that the rubber buffer 14 present at the stop element 7 does not act any longer as a limitation of the deflection in the direction of arrow $P_2$ of the selector lever 1 and, on the other hand, that due to the absence of the stop element 7, the ratchet lever 17 is pivoted upward in the direction of the selector lever 1 with the support of a spring designed as a leg spring 23 and snaps into the detent 18 arranged laterally at the selector lever 1 in its upper end position. The snapping in causes the selector lever 1 to remain in the emergency release position. The release movement for the parking brake is brought about by a carrier 19, which is located at the end of the cable 6 protruding into the control unit. Corresponding to the carrier 19, a hook-shaped opening 21 is located at the lower end of the selector lever 1, the opening 21 being used to actuate the carrier with the cable 6 coupled therewith during a movement of the selector lever 1 beyond the end position II into the emergency release position corresponding to the direction of arrow $P_2$ and to release the parking brake coupled with the cable 6 at the other transmission-side end.

Figure 5:
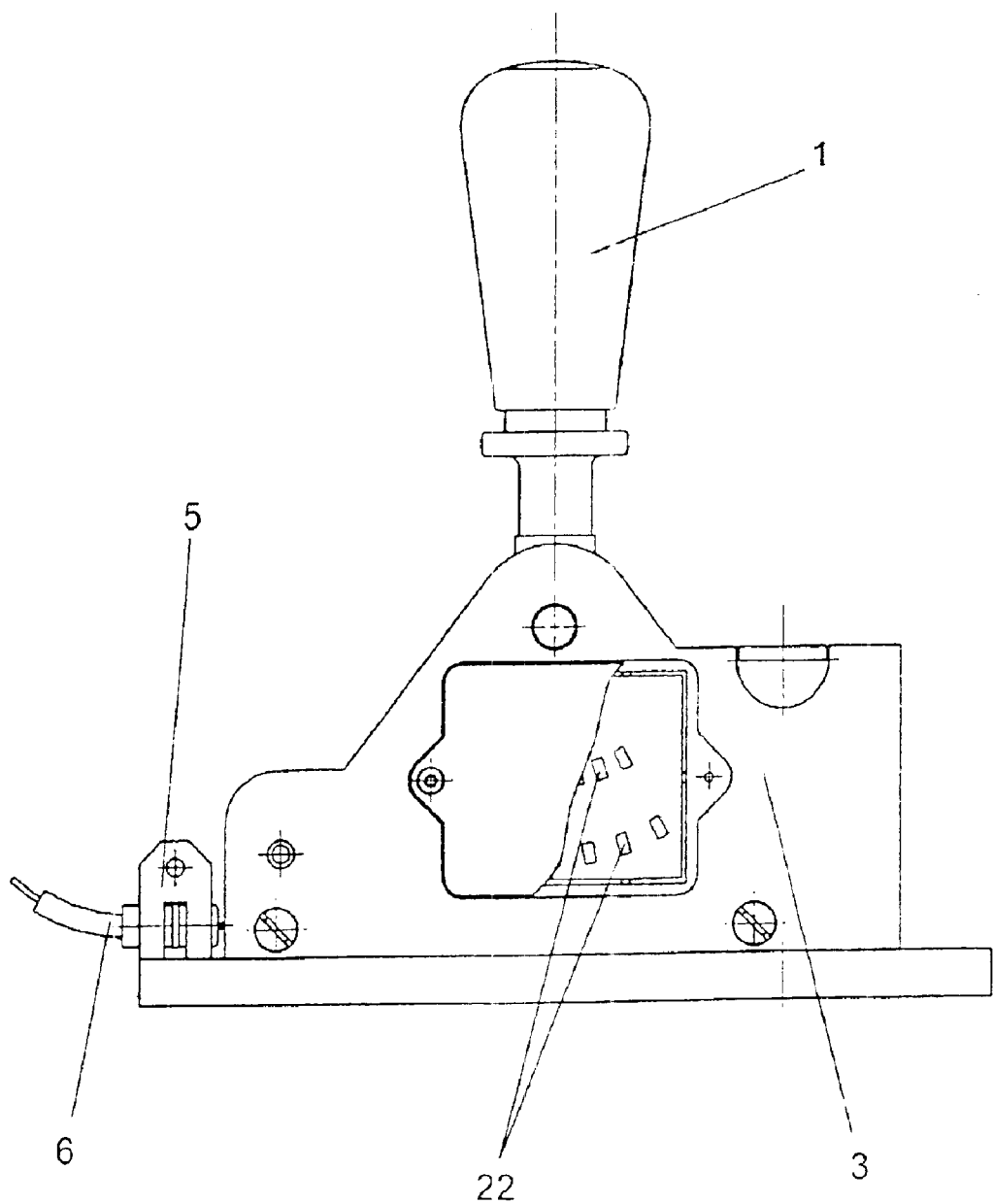
FIG. 5 is a side view of the control unit with a partial section to illustrate the control elements of the operating device to transmit the emergency release position as well as the gear commands

The view in FIG. 5 shows another embodiment variant, in which the control element, which is present at the selector lever 1 as part of the operating device for the emergency release mechanism, is designed as a Hall sensor system. A number of Hall sensors 22, which sensitively respond to magnetic fields and can generate corresponding electronic control signals, are fastened here in the area of the housing wall of the control unit. The individual Hall sensors 22 are associated with a corresponding position of the selector lever 1 each. At least one permanent magnet is fastened to the selector lever 1 itself in such a position that it sweeps one or more of the Hall sensors 22 during the pivoting of the selector lever 1 or is located opposite the Hall sensors belonging to the given position in the individual pivoted positions, so that an electronic transducer signal can be formed.

Such a transducer signal can also be generated after the removal of the stop element 7 and pivoting of the selector lever 1 beyond the end position II into the emergency release position by the Hall sensors belonging to this position. The command generated to release the parking brake of the emergency release mechanism in the motor vehicle transmission can be transmitted electronically via a control electronic system and a corresponding cabling, so that the transmission of the control command by means of a cable 6 as shown in the preceding figures can be eliminated.

It is, of course, conceivable that the control commands for the gears of the automatic transmission of the motor vehicle are generated by means of a Hall sensor system, which is especially advantageous from the viewpoint of wear, but the control commands for the release of the parking brake continue to be transmitted by means of a cable 6, as was already shown in FIG. 4, because release also must be guaranteed when vehicle system voltage is absent or insufficient.

While specific embodiments of the invention have been shown and described in detail to illustrate the application of the principles of the invention, it will be understood that the invention may be embodied otherwise without departing from such principles.

What is claimed is:

1. A motor vehicle automatic transmission gear or shift program selection control unit comprising:
    a driver actuated operating device for an emergency release mechanism, by which a parking brake of the motor vehicle transmission can be released;
    a housing with a mount;
    a selector lever which can be brought into at least two end positions, the selector lever being connected to the housing, said operating device of the emergency release mechanism being an integral part of the control unit, said operating device including a detachable stop element with a coded release mechanism, said stop element being secured in said mount of the control unit by means of said coded release mechanism, said detachable stop element acting as a movement limitation for the release movement of the parking brake by said operating device in the non-actuated state of the emergency release mechanism, said stop element and said coded release element being removable from said mount and said housing.

2. A control unit in accordance with claim 1, wherein the operating device includes a control element at said selector lever, said control element being coupled with said parking brake arranged at the motor vehicle transmission, by a connection member.

3. A control unit in accordance with claim 2, wherein said control element includes a carrier engaging a hook-like opening at said selector lever, upon said selector lever being brought into a release position for the parking brake.

4. A control unit in accordance with claim 2, wherein said control element has a Hall sensor system to generate an electric indication signal for the position of the parking brake.

5. A control unit in accordance with claim 1, wherein the release movement of the parking brake takes place due to a displacement of the selector lever beyond a selection end position.

6. A control unit in accordance with claim 1, further comprising a locking device for fixing the operating device for the parking brake in its release position, said locking device being arranged in said housing.

7. A control unit in accordance with claim 6, wherein said locking device has a ratchet lever mounted rotatably in said housing with a recess and a detent fixed to said selector lever, wherein said recess and said detent are engaged with one another in the release position of the selector lever for the parking brake.

8. A control unit in accordance with claim 1, wherein said coded release mechanism associated with said stop element is secured by means of a key code.

9. A control unit in accordance with claim 1, wherein said coded release mechanism associated with said stop element is secured by an electronic coding device.

10. A motor vehicle automatic transmission gear or shift program selection control unit comprising:
    a housing with a mount;
    a driver actuated operating device for an emergency release mechanism, by which a parking brake of the motor vehicle transmission can be released, said operating device being connected to said housing, said operation device including a detachable stop element secured in said mount via a coded release mechanism; and
    a selector lever connected to said housing, said selector lever being movable into at least two end positions, said detachable stop element acting as a movement limitation to said selector lever defining one of said two end positions, said stop element acting as a movement limitation to said operating device to stop release movement of the parking brake by said operating device in a non-actuated state of the emergency release mechanism.

11. A control unit in accordance with claim 1, further comprising:
    a locking device arranged in said housing and including a ratchet lever rotatably arranged in said housing, said ratchet lever defining a recess;
    a detent arranged on said selector lever,
    a spring biasing said ratchet lever against said stop element.

12. A control unit in accordance with claim 1, wherein: said stop element includes a rubber buffer.

13. A control unit in accordance with claim 12, wherein: said selector lever is in contact with said rubber buffer in one of said end positions.

14. A control unit in accordance with claim 11, wherein: said stop element includes a rubber buffer; said selector lever is in contact with said rubber buffer in one of said end positions.

15. A brake release arrangement for a motor vehicle, the arrangement comprising:
    a housing;
    a selector lever pivotally mounted in said housing along a pivot path between first and second ends;
    a detachable stop element selectively arrangable in a first position and a second position, said first position being in said housing and in said pivot path, said second position being spaced and detached from said housing and said pivot path, said detachable stop element in said first position blocking movement of said selector lever into said first end of said pivot path and limiting movement of said selector lever to a sub-path of said pivot path;

a coded release element selectively fixing said detachable stop element in, and releasing said detachable stop element from, said first position in said housing;

a brake disengaging element in said housing and disengaging a brake of the vehicle when said selector lever is arranged at said first end.

16. An arrangement in accordance with claim 15, wherein:

a shift element is connected to said selector lever and shifts a transmission of the vehicle when said selector lever is moved in said sub-path.

17. An arrangement in accordance with claim 16, wherein:

said selector lever is movable into a plurality of positions in said sub-path for shifting the transmission into a plurality of gears.

18. An arrangement in accordance with claim 16, wherein:

said brake disengaging element disengages the transmission from a park position.

19. An arrangement in accordance with claim 15, wherein:

said coded release element is formed to repetitively connect and disconnect said stop element from said housing and said pivot path without significantly damaging said coded release element.

20. An arrangement in accordance with claim 15, wherein:

said second position of said stop element is completely separatable from said housing, said selector lever and said pivot path.

* * * * *